Patented Oct. 22, 1935

2,018,449

UNITED STATES PATENT OFFICE 2,018,449

MANUFACTURE OF MONOCALCIUM PHOSPHATE

William H. Knox, Jr., Nashville, Tenn., assignor to Victor Chemical Works, a corporation of Illinois No Drawing. Application March 16, 1934, Serial No. 715,999

5 Claims. (Cl. 23—109)

This invention relates to the manufacture of monocalcium phosphate, and more particularly to a method for producing the reaction between phosphoric acid and a lime base at a low temperature.

The preparation of commercial monocalcium phosphate is at present carried out by combining a suitable lime base, generally quicklime or hydrated lime, with phosphoric acid. The reaction has been carried out with 50–52° Bé. gravity strength phosphoric acid to prevent too rapid setting of the mixture. The product has then been dried at a low temperature, and frequently in a vacuum. A small excess of lime has generally been used, since otherwise the free acid content of the product is high, so that the product as commercially produced has about 1.00% of a free acid and 8% to 10% of dicalcium phosphate. The dicalcium phosphate is primarily due to the excess lime, but is partially due to inability to mix the materials properly before the mixture sets.

In accordance with the present invention, the reaction between the lime and the phosphoric acid is carried out at a substantially lower temperature than is commonly employed, which permits the reaction with strong phosphoric acid to proceed sufficiently slowly to allow more intimate mixing and more complete reaction before setting. At the same time the product produced is not only pure but has quite different physical characteristics than monocalcium phosphate heretofore produced. The individual particles or crystal agglomerates are physically harder than those heretofore obtained, which results in a higher percentage of granular particles upon milling and a lower percentage of fine dust.

In carrying out the invention, the desired quantity of a substantially dry lime base, preferably hydrated lime, is introduced into a vacuum mixer of conventional design such as a horizontal rotary autoclave equipped with agitator, vacuum connections and discharge door. The pressure is then reduced and phosphoric acid sufficient theoretically to convert about 95% of the lime to monocalcium phosphate is introduced. While it has been customary to use acid of 50 to 55° Bé. gravity, in the present process an acid of 55 to 60° Bé. gravity may be employed without causing the product to set too quickly.

The vacuum, which may be from 3 to 20 inches of mercury at the time of the introduction of the phosphoric acid, is increased until, at the time the reaction is proceeding most violently, a vacuum of 20 to 28 inches of mercury is employed.

During the reaction the mass is continually agitated, and this agitation and the vacuum are maintained until the reaction mass has completely set up into hard granular lumps and the temperature has been reduced approximately to that of the surrounding atmosphere. Normally this will require about thirty minutes, and the vacuum is then released and the product discharged to storage bins or directly to the mills.

Due to the vacuum the temperature is sufficiently low to prevent the formation of any monocalcium phosphate without its full amount of water of crystallization. The lower temperature further prevents the partial hydrolysis of the product into free acid and dicalcium phosphate.

The use of the vacuum causes the reaction to take place below 100° C., and normally at a temperature of the order of 85° C., which is about 20 to 40° C. lower than the temperature at which ordinary commercial processes are carried out. The vacuum also removes all gaseous products of the reaction, including the water vapor, as fast as they are formed. Due to the use of the stronger acid, there is of course less moisture present to be driven out of the product, so that drying is materially hastened.

The product usually contains less than 2% moisture and shows a neutralizing value with respect to sodium bicarbonate of as much as 87%. The free acid content is below 1.00%, and the dicalcium phosphate content below 7%. Normal commercial monocalcium phosphate generally has a neutralizing value of 80% to 84%, a free acid content of about 1.00%, and a dicalcium phosphate content of about 8% to 10%.

While the preferred form of lime base is hydrated lime, the reaction may also be produced from such bases as quicklime, dicalcium phosphate, tricalcium phosphate or calcium carbonate.

The differences in the physical characteristics of the product are apparently due to the formation of finer crystals on account of rapid evaporation of moisture. These finer crystals occur in clusters which resemble snowballs and are lighter and harder than is the case with the normal commercial product.

The foregoing detailed description has been given for clearness of understanding only, and no unnecessary limitations should be understood therefrom, but the appended claims should be construed as broadly as permissible, in view of the prior art.

What I regard as new and desire to secure by Letters Patent:

1. The process of reacting strong phosphoric acid and a substantially dry lime base to produce monocalcium phosphate and water, characterized by carrying out substantially all of the resulting reaction under a substantial vacuum, whereby the evaporation of water maintains a reaction temperature below 100° C.

2. The process of reacting phosphoric acid and a lime base to produce monocalcium phosphate, characterized by carrying out substantially all of the reaction under a vacuum sufficient to produce a reaction temperature of about 85° C.

3. The method as set forth in claim 1 in which a phosphoric acid of from 55° to 60° Bé. gravity strength is employed.

4. The method as set forth in claim 1 in which the vacuum is from 20 to 28 inches of mercury.

5. The method as set forth in claim 1 in which the mixture is continuously agitated under a vacuum until the reaction mass has cooled to approximately room temperature.

W. H. KNOX, Jr.